US012591805B2

(12) United States Patent
Chen et al.

(10) Patent No.: US 12,591,805 B2
(45) Date of Patent: Mar. 31, 2026

(54) EQUIPMENT PARAMETER MANAGEMENT AT A MANUFACTURING SYSTEM USING MACHINE LEARNING

(71) Applicant: Applied Materials, Inc., Santa Clara, CA (US)

(72) Inventors: Tsung-Liang Chen, South Hamilton, MA (US); Lars Henrik Schneider, Dresden (DE); Michael David Armacost, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 866 days.

(21) Appl. No.: 17/821,349

(22) Filed: Aug. 22, 2022

(65) Prior Publication Data

US 2024/0062097 A1    Feb. 22, 2024

(51) Int. Cl.
*G06N 20/00* (2019.01)
*G05B 13/02* (2006.01)
*G05B 13/04* (2006.01)

(52) U.S. Cl.
CPC ......... *G06N 20/00* (2019.01); *G05B 13/0265* (2013.01); *G05B 13/042* (2013.01); *G05B 2219/45031* (2013.01)

(58) Field of Classification Search
CPC .......... G06N 20/00; G06N 3/084; G06N 3/09; G06N 3/0464; G05B 13/0265; G05B 13/042; G05B 2219/45031
See application file for complete search history.

(56) References Cited

U.S. PATENT DOCUMENTS

| | | | |
|---|---|---|---|
| 2009/0198635 A1 | 8/2009 | Doddi et al. | |
| 2018/0182653 A1* | 6/2018 | Chong | H01L 21/67242 |
| 2020/0110390 A1 | 4/2020 | Banna | |
| 2020/0264335 A1* | 8/2020 | Bhatia | G05B 19/4183 |
| 2021/0042570 A1* | 2/2021 | Iskandar | G06F 18/285 |
| 2021/0066141 A1 | 3/2021 | Phan et al. | |

FOREIGN PATENT DOCUMENTS

| | | |
|---|---|---|
| WO | 2021197717 A1 | 10/2021 |
| WO | 2022140097 A1 | 6/2022 |

OTHER PUBLICATIONS

International Search Report and Written Opinion for International Application No. PCT/US2023/030735, mailed Dec. 6, 2023, 8 Pages.

* cited by examiner

*Primary Examiner* — Kamini S Shah
*Assistant Examiner* — Zachary Andrew Cain
(74) *Attorney, Agent, or Firm* — Lowenstein Sandler LLP

(57) ABSTRACT

A method includes receiving first data associated with an equipment parameter. The first data is indicative of an equipment setting of a process tool of a plurality of process tools at a first manufacturing system. The method further includes providing the first data as input to a trained machine learning model. The trained machine learning model is trained using historical data pertaining to equipment parameters of the plurality of process tools at the first manufacturing system. The method further includes obtaining, as output of the trained machine learning model, a predicted value of a metric corresponding to the equipment parameter. The method further includes comparing the predicted value of the metric with the first data, and performing a corrective action based on the comparing.

20 Claims, 7 Drawing Sheets

400

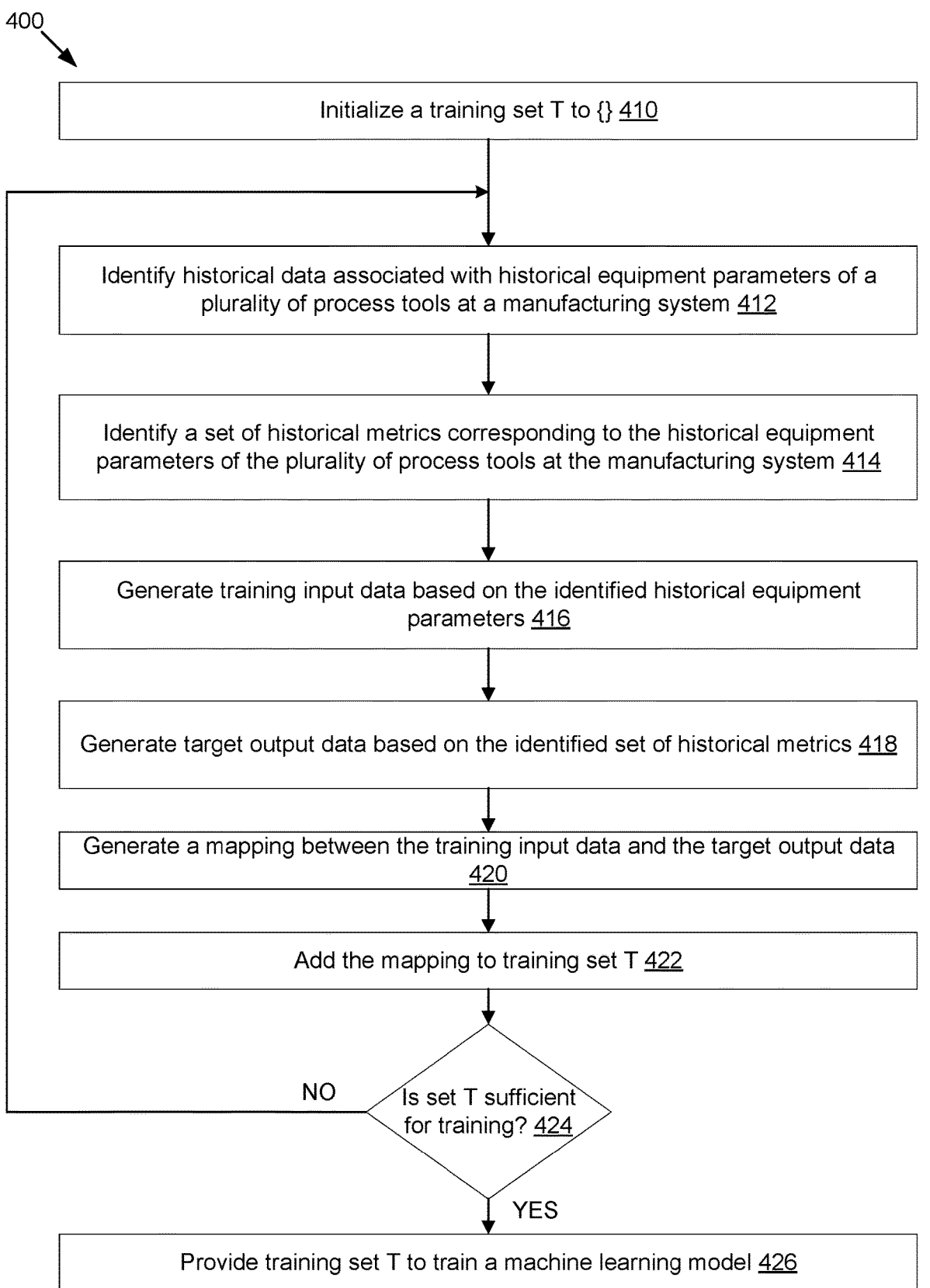

Initialize a training set T to {} 410

Identify historical data associated with historical equipment parameters of a plurality of process tools at a manufacturing system 412

Identify a set of historical metrics corresponding to the historical equipment parameters of the plurality of process tools at the manufacturing system 414

Generate training input data based on the identified historical equipment parameters 416

Generate target output data based on the identified set of historical metrics 418

Generate a mapping between the training input data and the target output data 420

Add the mapping to training set T 422

NO    Is set T sufficient for training? 424

YES

Provide training set T to train a machine learning model 426

FIG. 4

600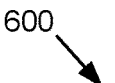

Receive first data associated with an equipment parameter, wherein the first data is indicative of an equipment setting associated with a process tool of a plurality of process tools at a first manufacturing system 610

Provide the first data as input to a trained machine learning model, wherein the trained machine learning model is trained using historical data pertaining to equipment parameters of the plurality of process tools at the first manufacturing system 612

Obtain, as output of the trained machine learning model, a predicted value of a metric corresponding to the equipment parameter 614

Compare the predicted value of the metric with the first data 616

Perform a corrective action based on the comparing 618

FIG. 6

EQUIPMENT PARAMETER MANAGEMENT AT A MANUFACTURING SYSTEM USING MACHINE LEARNING

TECHNICAL FIELD

Embodiments of the present disclosure relate, in general, to manufacturing systems and more particularly managing equipment parameters at a manufacturing system using machine learning.

BACKGROUND

As the size of electronic devices continue to shrink, substrate processing complexity has continued to increase. Some techniques for manufacturing substrates can involve multiple different processes. Further, multiple pieces of equipment can be used for manufacturing substrates, with many pieces of equipment making up a substrate manufacturing system and/or a substrate manufacturing facility. Each piece of equipment can operate based on multiple equipment parameters. The equipment parameters can determine how the equipment may operate. A collection of the multiple equipment parameters can be used as a benchmark for operating the equipment to manufacture substrates. It can be difficult and time consuming to determine the collection of the equipment parameters and/or how much to modify an individual equipment parameter to optimize a process performed by a piece of substrate manufacturing equipment.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some embodiments, a method includes receiving first data associated with an equipment parameter. The first data is indicative of an equipment setting of a process tool of a plurality of process tools at a first manufacturing system. The method further includes providing the first data as input to a trained machine learning model. The trained machine learning model is trained using historical data pertaining to equipment parameters of the plurality of process tools at the first manufacturing system. The method further includes obtaining, as output of the trained machine learning model, a predicted value of a metric corresponding to the equipment parameter. The method further includes comparing the predicted value of the metric with the first data, and performing a corrective action based on the comparing.

In some embodiments, a system includes a memory, and a processing device coupled to the memory. The processing device is to receive first data associated with an equipment parameter. The first data is indicative of an equipment setting of a process tool of a plurality of process tools at a first manufacturing system. The processing device is further to provide the first data as input to a trained machine learning model. The trained machine learning model is trained using historical data pertaining to equipment parameters of the plurality of process tools at the first manufacturing system. The processing device is further to obtain, as output of the trained machine learning model, a predicted value of a metric corresponding to the equipment parameter. The processing device is further to compare the predicted value of the metric with the first data, and perform a corrective action based on the comparing.

In some embodiments, a non-transitory computer readable medium includes instructions that, when executed by a processing device, cause the processing device to receive first data associated with an equipment parameter. The first data is indicative of an equipment setting of a process tool of a plurality of process tools at a first manufacturing system. The processing device is further to provide the first data as input to a trained machine learning model. The trained machine learning model is trained using historical data pertaining to equipment parameters of the plurality of process tools at the first manufacturing system. The processing device is further to obtain, as output of the trained machine learning model, a predicted value of a metric corresponding to the equipment parameter. The processing device is further to compare the predicted value of the metric with the first data, and perform a corrective action based on the comparing.

BRIEF DESCRIPTION OF THE DRAWING

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 4 is a flow chart of a method for training a machine learning model, according to aspects of the present disclosure.

FIG. 6 is a flow chart of a method for estimating an equipment parameter using machine learning, according to aspects of the present disclosure.

DETAILED DESCRIPTION OF EMBODIMENTS

Figure 1:
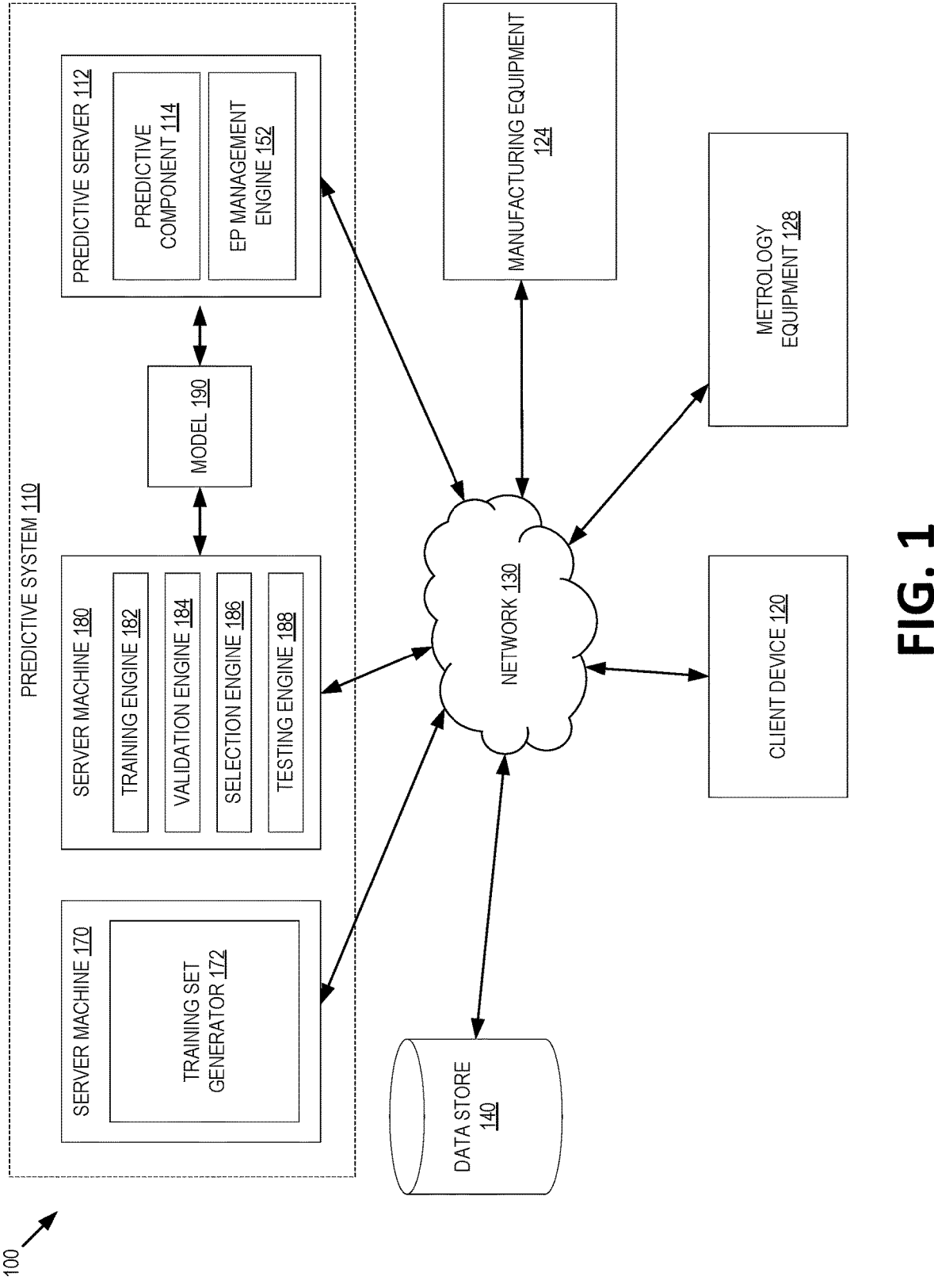
FIG. 1 depicts an illustrative system architecture, according to aspects of the present disclosure.

Implementations described herein provide systems and methods for equipment parameter management at a manufacturing system using machine learning. In some instances, multiple process tools may be used to process substrates. Each tool may perform one or more operations to process a substrate, or each tool may perform multiple operations to process multiple substrates. As the size of electronic devices continue to shrink, process tools continue to grow in complexity. For example, each process tool may include multiple sensors, valves, heating elements, or other components, etc. to perform substrate processing during a substrate manufacturing process. Each component of the process tool may operate based on one or more parameters (e.g., associated with one or more settings).

A substrate manufacturing system including many process tools may have multiple (e.g., hundreds or sometimes thousands) equipment parameters. As described herein, each equipment parameter may correspond to an individual setting of a process tool. For example, an equipment parameter may correspond to a setting of a heating element disposed within a process chamber. In another example, an equipment parameter may relate to a calibration setting of a sensor (e.g., a temperature sensor, a flow sensor, etc.) that monitors conditions of the interior of a process tool (e.g., a process chamber, a transfer chamber, etc.). In another example, an equipment parameter may reflect an offset for a substrate transfer robot to operate relative to a predetermined datum (e.g., a "zero" point).

As substrates are processed, at least some equipment parameters may change so that substrates processed at the manufacturing system continue to meet process targets. Similarly, some equipment parameters may change as equipment wears. For example, a sensor may gradually fall out of calibration and begin to report erroneous sensor data to a controller (e.g., a processing device, a processor, etc.). One or more equipment parameters related to calibration of the sensor may be changed during substrate processing so that the sensor data accurately reflects the condition of the process (e.g., the substrate process, the condition of the process chamber, etc.). Some equipment parameters vary from tool to tool. For instance, similar process tools (e.g., process chambers, substrate process robots, etc.) may have different wear from substrate processing (e.g., due to dissimilar run times, maintenance schedules, variability in component parts, etc.) which necessitates equipment parameters correlating to the same settings of the different process tools to have different values.

Certain equipment parameters may have a heightened importance (e.g., are more critical) than other equipment parameters. For instance, changes to a first given equipment parameter may alter substrate processing more than similar changes to a second given equipment parameter. Because of the changes that can result from changing equipment parameters, it may be beneficial to monitor the equipment parameters to ensure that the equipment parameters do not drift outside a predetermined range of values. In some examples, a drifting equipment parameter may indicate to a user (e.g., an engineer, a technician, etc.) that a component of the substrate manufacturing system is defective. A drifting equipment parameter may also indicate that processed substrates may not match a target process result. Corrective action may be necessary to return the equipment parameter to within its predetermined range.

A collection of equipment parameters (e.g., a list of equipment parameters) related to the process tools of the manufacturing system can be used as a benchmark for operating the manufacturing system. For example, the list of equipment parameters may indicate beginning settings for the multiple components of the process tools at the manufacturing system. When a new manufacturing system is commissioned (e.g., run for the first time to manufacture substrates, etc.), the manufacturing system can be run using the initial list of equipment parameters. Each individual equipment parameter can be changed over time to optimize the manufacturing system and/or to account for differences in process tools, such as component tolerances and variability.

Conventionally, a user or users (e.g., human users) of the manufacturing system compile the list of equipment parameters. The user (or users) may determine a default value or a default value range of each equipment parameter after extensive studying and/or experimentation. The user may also determine the criticality of each equipment parameter and may assign a criticality value to each equipment parameter. The user may study data collected during operation of the manufacturing system to make these determinations. Because of the large number (sometimes extremely large number) of equipment parameters, a user may consume large amounts of time and resources to compile the list and default values of the equipment parameters.

Aspects of the present disclosure address the deficiencies of the conventional methods of monitoring and assigning default values to equipment parameters by providing systems and methods for equipment parameter management at a manufacturing system using machine learning. In some embodiments, a processing device (e.g., a processor, a controller, etc.) can receive data (e.g., from the manufacturing system) associated with one or more equipment parameters. Machine learning techniques can be used to determine whether the equipment parameter is within an appropriate range of values. Additionally, using historical equipment parameter data collected during operation of the manufacturing system over an interval of time (e.g., a day, a preventive maintenance cycle, etc.), machine learning techniques can be used to assign default values and/or default ranges to multiple equipment parameters. Further, machine learning techniques can be used to assign criticality values to each of the equipment parameters, where each criticality value corresponds to the criticality of each of the equipment parameters. Machine learning techniques can also be used to predict updates to each of the equipment parameters, based on current values of the equipment parameters and historical data. Through machine learning, the equipment parameters may be modified to optimize the manufacturing of substrates at the manufacturing facility.

Embodiments of the present disclosure provide techniques to optimize a substrate manufacturing process using machine learning. Embodiments of the present disclosure utilize machine learning techniques to monitor and/or update equipment parameters during substrate manufacturing and/or during substrate processing. Further, embodiments of the present disclosure utilize machine learning techniques to compile a list of equipment parameters and assign default values, default ranges, and/or default criticality values to each equipment parameter. Conventionally, human users were relied upon to perform the functions discussed in the present disclosure. Thus, the methods and systems disclosed herein can reduce time used to compile the list of equipment parameters and may substantially eliminate human bias and inaccuracy of conventional methods. Further, variations in equipment parameters can be quickly addressed using the systems and methods described herein which increases the accuracy and overall throughput of the manufacturing system.

FIG. 1 depicts an illustrative system architecture 100, according to aspects of the present disclosure. In some embodiments, system architecture 100 may be included as part of a manufacturing system for processing substrates. System architecture 100 may include one or more client devices 120, manufacturing equipment 124, metrology equipment 128, a predictive server 112 (e.g., to generate predictive data, to provide model adaptation, to use a knowledge base, etc.), and a data store 140. The predictive server 112 can be part of a predictive system 110. The predictive system 110 can further include server machines 170 and 180. The manufacturing equipment 124 can include sensors configured to capture data for a substrate being processed at the manufacturing system. In some embodiments, the manufacturing equipment 124 and sensors can be part of a sensor system that includes a sensor server (e.g., field service server (FSS) at a manufacturing facility) and sensor identifier reader (e.g., front opening unified pod (FOUP) radio frequency identification (RFID) reader for sensor system). In some embodiments, metrology equipment 128 can be part of a metrology system that includes a metrology server (e.g., a metrology database, metrology folders, etc.) and metrology identifier reader (e.g., FOUP RFID reader for metrology system). It should be noted that although metrology equipment 128 and manufacturing equipment 124 are depicted in FIG. 1 as separate components, metrology equipment 128 can be included as part of manufacturing equipment 124. For example, manufacturing equipment 124 can include a process tool. One or more components of metrology equipment 128 can be integrated within one or more components or stations of the process tool. For example, one or more components of metrology equipment 128 can be integrated within a factory interface, a load lock, a transfer chamber, a process chamber, and/or one or more additional stations of a process tool of manufacturing equipment 124.

Manufacturing equipment 124 produces products following a recipe and/or performing runs over a period of time. Manufacturing equipment 124 can include one or more sensors configured to generate data for a substrate during a substrate process (referred to as sensor data). Sensor data may include a value of one or more of temperature (e.g., heater temperature), spacing (SP), pressure, high frequency radio frequency (HFRF), voltage of electrostatic chuck (ESC), electrical current, flow, power, voltage, etc. Sensor data may be associated with or indicative of manufacturing parameters such as hardware parameters, such as settings or components (e.g., size, type, etc.) of the manufacturing equipment 124, equipment parameters of the manufacturing equipment 124, or process parameters of the manufacturing equipment 124. The sensor data can be provided while the manufacturing equipment 124 is performing manufacturing processes (e.g., equipment readings when processing products). The sensor data can be different for each substrate.

In some embodiments, manufacturing equipment 124 operates based on equipment parameters (e.g., parameters, hardware parameters, equipment constants, etc.). The parameters may determine the behavior of the manufacturing equipment. In some examples, equipment parameters include calibration values, offset values, and/or scaling factor values for operation of the manufacturing equipment 124. In a specific example, a processing device (e.g., a processor) of the manufacturing equipment 124 may utilize a scaling factor to scale data received via a sensor. In another example, a processing device may utilize a calibration value to calibrate one or more sensors. In some embodiments, parameters may be constant (e.g., substantially constant) across multiple manufacturing tools. However, similar manufacturing tools may have differing parameters based on differences between the tools, such as increased run time, increased wear, etc. Some parameters for a given manufacturing tool may remain constant over time, in some embodiments. Some parameters may change within a range of values. Some parameters may increase over time (e.g., counter parameters). In some embodiments, some parameters are reset and/or changed during maintenance (e.g., preventive maintenance, reactive maintenance, regular maintenance, cleaning, etc.) of the manufacturing tool. Some parameters are qualitative, meaning they relate to a mode of operation of the manufacturing tool. Data relating to equipment parameters may be stored in data store 140 as described herein.

Metrology equipment 128 provides metrology data associated with substrates (e.g., wafers, etc.) processed by manufacturing equipment 124. The metrology data can include a value of one or more of film property data (e.g., wafer spatial film properties), dimensions (e.g., thickness, height, etc.), dielectric constant, dopant concentration, density, defects, etc. In some embodiments, the metrology data can further include a value of one or more surface profile property data (e.g., an etch rate, an etch rate uniformity, a critical dimension of one or more features included on a surface of the substrate, a critical dimension uniformity across the surface of the substrate, an edge placement error, etc.). The metrology data can be of a finished or semi-finished product. The metrology data can be different for each substrate. In some embodiments, metrology equipment 128 can collect metrology data for each substrate processed at manufacturing equipment 124. In other or similar embodiments, metrology equipment 128 can collect metrology data for a portion of substrates processed at manufacturing equipment 124. For example, a lot of substrates can be processed at manufacturing equipment 124. Metrology equipment 128 can collect metrology data for a portion of the substrates in the lot (e.g., 15% of substrates in the lot, 20% of substrates in the lot, etc.). In some embodiments, systems of system architecture 100 (e.g., predictive system 110) can associate the metrology data collected for the portion of the substrates in the lot as representative of metrology data for each substrate in the lot.

The client device 120 includes a computing device such as personal computers (PCs), laptops, mobile phones, smart phones, tablet computers, netbook computers, network connected televisions ("smart TVs"), network-connected media players (e.g., Blu-ray player), a set-top box, over-the-top (OTT) streaming devices, operator boxes, etc. In some embodiments, metrology data may be received from the client device 120. IN some embodiments, equipment parameter data may be received from the client device 120. In some embodiments, client device 120 displays a graphical user interface (GUI), where the GUI enables the user to provide, as input, metrology measurement values for substrates processed at the manufacturing system. In some embodiments, the GUI may enable the user to provide, as input, equipment parameter values associated with the manufacturing equipment 124. In other or similar embodiments, client device 120 can display another GUI that enables user to provide, as input, an indication of a type of substrate to be processed at the manufacturing system, a type of process to be performed for the substrate, and/or a type of equipment at the manufacturing system.

Data store 140 can be a memory (e.g., random access memory), a drive (e.g., a hard drive, a flash drive), a database system, or another type of component or device capable of storing data. Data store 140 can include multiple storage components (e.g., multiple drives or multiple databases) that can span multiple computing devices (e.g., multiple server computers). In some embodiments, data store 140 can store data associated with parameters of a manufacturing tool(s) (referred to as parameter data herein). Parameter data can include an indication of one or more manufacturing equipment settings. The manufacturing equipment settings may relate to sensor calibration and/or to other equipment parameters. In some embodiments, parameter data can refer to historical parameter data (e.g., parameter data associated with prior settings of manufacturing equipment 124), and/or current parameter data (e.g., parameter data associated with current equipment settings.

In additional or alternative embodiments, data store 140 can store data collected for a substrate by sensors at or coupled to manufacturing equipment 124 before, during, and/or after performance of a substrate process (referred to as sensor data herein). For example, a process chamber can include one or more sensors (e.g., temperature sensors, spectral sensors, etc.) that are configured to collect data for a substrate and/or an environment within the process chamber before, during, or after a substrate process. A computing system associated with system architecture 100 (e.g., predictive system 110, a system controller for manufacturing equipment 124, etc.) can receive the sensor data collected before, during or after the substrate process and can store the sensor data at data store 140. In some embodiments, sensor data can refer to historical sensor data (e.g., sensor data collected for a prior substrate processed according to a prior substrate process) and/or current sensor data (e.g., sensor data collected for a current substrate that is being process, or is to be processed, according to a current substrate process).

Data store 140 can store additional types of data, in some embodiments. For example, data store can store metrology data associated with substrates processed using manufacturing equipment 124. Metrology data can include historical metrology data (e.g., metrology measurement values generated for a prior substrate processed using manufacturing equipment 124) and/or current metrology data (e.g., metrology measurement values generated for a current substrate processed using manufacturing equipment 124). Data store 140 can also store contextual data associated with one or more substrates (e.g., prior substrates, current substrates, etc.) at the manufacturing system. Contextual data can include an identifier for a process recipe, an identifier for a substrate (and/or lot of substrates), a preventive maintenance indicator, an identifier for an operator, and so forth.

In some embodiments, data store 140 can be configured to store data that is not accessible to a user (e.g., an operator, an engineer, etc.) of the manufacturing system. For example, process data, sensor data, metrology data, and/or contextual data obtained for a substrate may not be accessible to a user of the manufacturing system. In some embodiments, all data stored at data store 140 is inaccessible by a user (e.g., an operator) of the manufacturing system. In other or similar embodiments, a portion of data stored at data store 140 is inaccessible by the user while another portion of data stored at data store 140 is accessible by the user. In some embodiments, one or more portions of data stored at data store 140 are encrypted using an encryption mechanism that is unknown to the user (e.g., data is encrypted using a private encryption key). In other or similar embodiments, data store 140 includes multiple data stores where data that is inaccessible to the user is stored in one or more first data stores and data that is accessible to the user is stored in one or more second data stores.

Predictive server 112 can include an equipment parameter (EP) management engine 152 and/or predictive component 114. In some embodiments, the predictive component 114 and/or the EP management engine 152 are part of predictive server 112 or connected to the predictive server 112 via network 130 (e.g., predictive component 114 and/or EP management engine 152 are part of a computing system connected to network 130). EP management engine 152 can be configured to tune and/or modify equipment parameters of manufacturing equipment 124 in order to optimize substrate processing at the manufacturing system. EP management engine 152 can, in some embodiments, determine (e.g., via predictive system 110) predicted values corresponding to the equipment parameters. In some embodiments, EP management engine 152 can output a list of equipment parameters corresponding to process tools of manufacturing equipment 124. The list of equipment parameters may include predicted default values and/or default value ranges corresponding to each of the equipment parameters. The predicted values may be determined via predictive system 110 as described herein.

In some embodiments, EP management engine 152 can update equipment settings (e.g., of manufacturing equipment 124) based on the equipment parameters and/or based on historical equipment parameter data. In some embodiments, the EP management engine 152 may update the equipment settings and/or equipment parameters based on a metric (e.g., a predicted value, a predicted characterization value, a predicted classification value, a predicted criticality value, etc.) output from a trained machine learning model. In some examples, the EP management engine 152 updates an equipment parameter based on receiving a metric (e.g., output from a trained machine learning model, output from predictive system 110, etc.) indicating that a setting of a process tool (e.g., a process chamber, a transfer chamber, etc.) has drifted. In some embodiments, the EP management engine 152 may update equipment parameters (e.g., corresponding to manufacturing equipment 124) based on various tool states. For example, the EP management engine 152 may update the equipment parameters based on a tool fault state, a tool maintenance state (e.g., preventive maintenance state), and/or a normal operation state, etc. In some embodiments, one or more equipment parameters are reflective of the various tool states. In some embodiments, EP management engine 152 may provide a notification for display on a GUI (e.g., of client device 120) that indicates the process tool setting has drifted and that the equipment parameter is to be updated. In some embodiments, the list of equipment parameters (e.g., generated and/or compiled by EP management engine 152) together with predicted default values may be output for use at another manufacturing system. In some embodiments, the EP management engine 152 may monitor equipment parameters to determine that similar process tools (e.g., of manufacturing equipment 124) process substrates in a similar manner (e.g., a substantially similar manner) to achieve a target process result.

As described herein below with respect to FIG. 2, in some embodiments, EP management engine 152 can characterize equipment parameters. In some embodiments, EP management engine 152 can determine characteristics of equipment parameters. In some embodiments, EP management engine 152 can classify equipment parameters based on a characteristic (e.g., of the equipment parameter described herein above) as described in more detail herein below. In some embodiments, EP management engine 152 can assign and/or predict a default value and/or a default range of values of the equipment parameter as described herein. In some embodiments, as described herein, EP management engine 152 can detect whether an equipment parameter value has drifted and/or is to be updated. In many embodiments, the above functions of the EP management engine 152 may be accomplished using machine learning techniques as described herein below.

In some embodiments, predictive system 110 includes server machine 170 and server machine 180. Server machine 170 includes a training set generator 172 that is capable of generating training data sets (e.g., a set of data inputs and a set of target outputs) to train, validate, and/or test machine learning model 190. As described herein, machine learning model 190 can be trained to predict, based on given equipment parameter data and/or sensor data associated with one or more process tools, one or more metrics corresponding to equipment parameters. In some examples, the machine learning model 190 can predict an updated equipment parameter and/or an updated equipment setting. In some examples, the machine learning model 190 (and/or another machine learning model) can predict characterizations and/or classifications of given equipment parameters. In some examples, the machine learning model 190 (and/or another machine learning model) can predict criticality values corresponding to the equipment parameters. The predicted criticality values may indicate the importance of an equipment parameter. For example, a predicted criticality value may indicate how much change an associated equipment parameter affects. Some operations of training set generator 172 are described in detail below with respect to FIG. 4. In some embodiments, the training set generator 172 can partition the training data into a training set, a validating set, and a testing set. In some embodiments, the predictive system 110 generates multiple sets of training data.

Server machine 180 includes a training engine 182, a validation engine 184, a selection engine 186, and/or a testing engine 188. An engine can refer to hardware (e.g., circuitry, dedicated logic, programmable logic, microcode, processing device, etc.), software (such as instructions run on a processing device, a general purpose computer system, or a dedicated machine), firmware, microcode, or a combination thereof. Training engine 182 can be capable of training a machine learning model 190. The machine learning model 190 can refer to the model artifact that is created by the training engine 182 using the training data that includes training inputs and corresponding target outputs (correct answers for respective training inputs). The training engine 182 can find patterns in the training data that map the training input to the target output (the answer to be predicted), and provide the machine learning model 190 that captures these patterns. In some embodiments, the machine learning model 190 uses one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), clustering techniques (e.g., hierarchical clustering techniques), association techniques (e.g., apriori techniques), classification techniques (e.g., decision trees, random forest techniques, etc.), a variational recurrent auto-encoder, etc.

The validation engine 184 can be capable of validating a trained machine learning model 190 using a corresponding set of features of a validation set from training set generator 172. The validation engine 184 can determine an accuracy of each of the trained machine learning models 190 based on the corresponding sets of features of the validation set. The validation engine 184 can discard a trained machine learning model 190 that has an accuracy that does not meet a threshold accuracy. In some embodiments, the selection engine 186 can be capable of selecting a trained machine learning model 190 that has an accuracy that meets a threshold accuracy. In some embodiments, the selection engine 186 can be capable of selecting the trained machine learning model 190 that has the highest accuracy of the trained machine learning models 190.

The testing engine 188 can be capable of testing a trained machine learning model 190 using a corresponding set of features of a testing set from training set generator 172. For example, a first trained machine learning model 190 that was trained using a first set of features of the training set can be tested using the first set of features of the testing set. The testing engine 188 can determine a trained machine learning model 190 that has the highest accuracy of all of the trained machine learning models based on the testing sets.

Predictive server 112 includes a predictive component 114 that is capable of providing equipment parameter data and/or sensor data associated with manufacturing equipment 124 as input to trained machine learning model 190 and running trained machine learning model 190 on the input to obtain one or more outputs. As described herein, in some embodiments, outputs from machine learning model 190 may include predicted equipment parameter updates, predicted equipment parameter classifications/characterizations, predicted equipment parameter default values/ranges, and/or other predicted metrics associated with the equipment parameters of manufacturing equipment 124.

The client device 120, manufacturing equipment 124, metrology equipment 128, predictive server 112, data store 140, server machine 170, and server machine 180 can be coupled to each other via a network 130. In some embodiments, network 130 is a public network that provides client device 120 with access to predictive server 112, data store 140, and/or other publically available computing devices. In some embodiments, network 130 is a private network that provides client device 120 access to manufacturing equipment 124, metrology equipment 128, data store 140, and other privately available computing devices. Network 130 can include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

It should be noted that in some other implementations, the functions of server machines 170 and 180, as well as predictive server 112, may be provided by a fewer number of machines. For example, in some embodiments, server machines 170 and 180 may be integrated into a single machine, while in some other or similar embodiments, server machines 170 and 180, as well as predictive server 112, may be integrated into a single machine. In other or similar embodiments, server machines 170 and 180, and/or predictive server 112, can be integrated into a single machine or one or more machines.

In general, functions described in one implementation as being performed server machine 170, server machine 180, and/or predictive server 112 can also be performed on client device 120. In addition, the functionality attributed to a particular component can be performed by different or multiple components operating together.

In embodiments, a "user" can be represented as a single individual. However, other embodiments of the disclosure encompass a "user" being an entity controlled by a plurality of users and/or an automated source. For example, a set of individual users federated as a group of administrators may be considered a "user."

Figure 2:
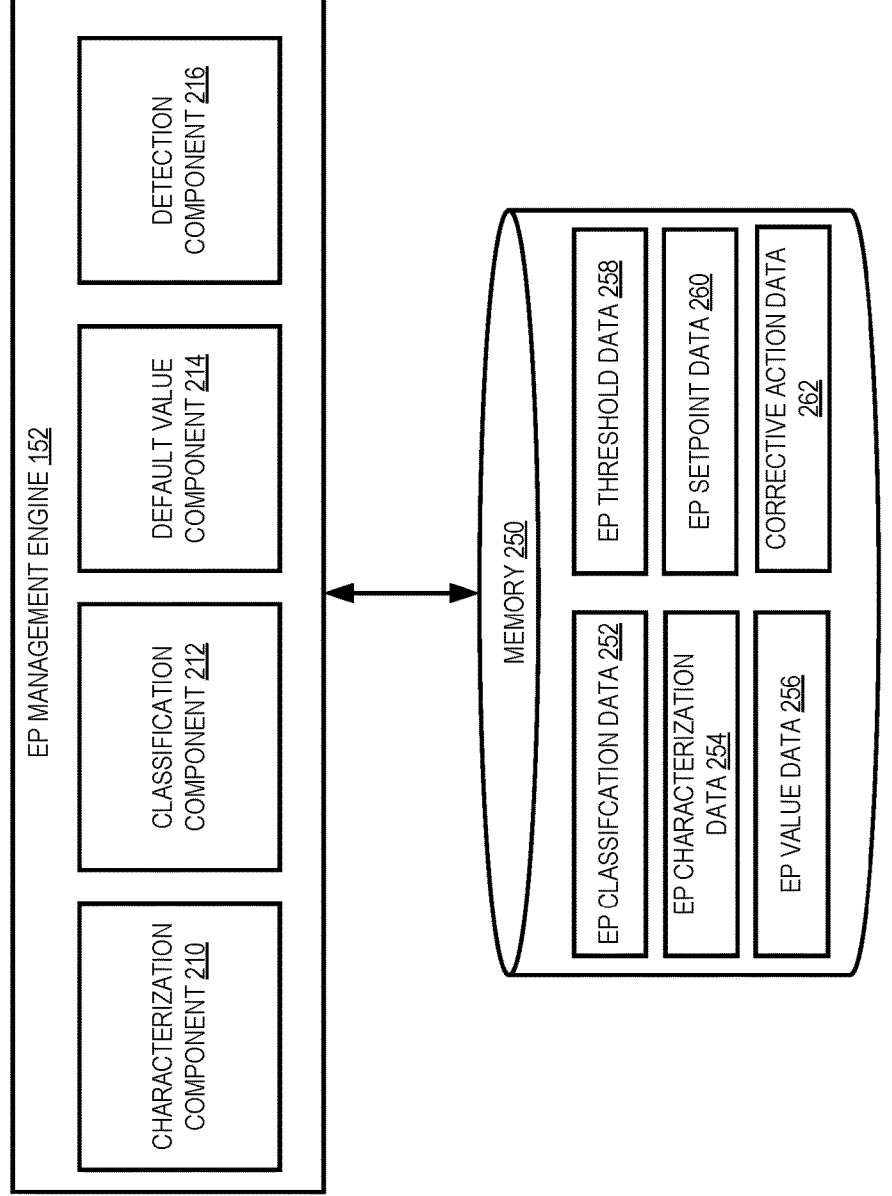
FIG. 2 is a block diagram of an example equipment parameter management engine, according to aspects of the present disclosure.

FIG. 2 is a block diagram of an example EP management engine 152, according to aspects of the present disclosure. As illustrated in FIG. 2, EP management engine 152 can include a characterization component 210, a classification component 212, a default value component 214, and/or a detection component 216. In some embodiments, EP management engine 152 can be connected to memory 250 (e.g., via network 130 described with respect to FIG. 1, via a bus, etc.). Memory 250 may correspond to one or more portions of data store 140, in some embodiments.

Characterization component 210 can be configured to determine characterization of equipment parameters. For example, characterization component 210 can determine that a given equipment parameter is to have a constant value within a fleet (e.g., a fleet of like process tools), a constant value within a tool, a quasi-constant value (e.g., substantially constant, below only a threshold variability, etc.), a randomly distributed value, an increasing value (e.g., as in a counter), and/or a text value. As described herein above, equipment parameter data can be collected from manufacturing equipment 124 (e.g., EP value data 256, EP threshold data 258, EP setpoint data 260, current EP data, 262, etc.). The equipment parameter data can be used by the characterization component 210 to determine one or more characteristics of the equipment parameters as described herein above (e.g., whether an equipment parameter is to have a constant or semi-constant value, whether an equipment parameter is to match between process tools, etc.).

Classification component 212 can be configured to classify an equipment parameter based on one or more characteristics of the equipment parameter. Classification component 212 may generate and/or access EP classification data 252 during classification operations. In some examples, classification component 212 can assign a classification value (e.g., a metric) to an equipment parameter based on the characteristic(s) of the equipment parameter. The classification value may indicate that the equipment parameter belongs to a discrete classification group. The classification value may be a numeric value. For example, the classification component 212 may assign an equipment parameter with a classification value of 1, indicating that the equipment parameter is to match for all like tools in a manufacturing system. In some embodiments, an equipment parameter that is to remain constant, as described in the immediately prior example, may be a numeric value or a text value. In another example, the classification component 212 may assign the equipment parameter with a classification value of 2, indicating that the equipment parameter is to be constant within a specified process tool (e.g., process chamber), but variability across process tools may be allowed. In a tertiary example, the classification component 212 may assign the equipment parameter with a classification value of 3, indicating that the equipment parameter is to be within a range in a process tool. In another example, the classification component 212 may assign the equipment parameter with a classification value of 4, indicating that the equipment parameter is to be within a range across a fleet of like process tools. In another example, the classification component 212 may assign the equipment parameter with a classification value of 5, indicating that the equipment parameter is to remain constant, except that the value of the equipment parameter may change during a preventive maintenance operation. In another example, the classification component 212 may assign the equipment parameter with a classification value of 6, indicating that the equipment parameter may constantly change values. In another example, the classification component 212 may assign the equipment parameter with a classification value of 7, indicating that the equipment parameter increases at regular intervals (e.g., that the equipment parameter is a counter, etc.). In some embodiments, the classification component 212 may assign the equipment parameter with other classification values not described herein. In some embodiments, the classification component 212 classifies an equipment parameter based on EP characterization data 254 and/or EP value data 256 (e.g., current EP value data and/or historic EP value data).

Default value component 214 can be configured to assign a default value and/or a default range of values to an equipment parameter. Default value component 214 may generate and/or access EP value data 256, EP threshold data 258, and/or EP setpoint data 260 during operations. In some examples, via machine learning techniques, default value component 214 may determine default values and/or default ranges corresponding to each equipment parameter. Specifically, the default value component 214 may determine that the default value of a given equipment parameter is to be a specific determined value. Similarly, the default value component 214 may determine that the value of another given equipment parameter is to be within a specific determined range of values (e.g., between a determined lower value and a determined upper value). In some embodiments, the default value component 214 generates EP threshold data 258 that indicates the equipment parameter is to have a value within a specific determined default threshold. Similarly, in some embodiments, the default value component 214 generates EP setpoint data 260 that indicates the equipment parameter is to have a value at a specific determined default setpoint. In some examples, the default value component 214 may determine that a given equipment parameter is to have a specific text value as a default. For instance, the default value component 214 may determine that a text value of a given equipment parameter is to indicate the process tool is to operate in a certain default mode. In some embodiments, the default value component 214 may use EP classification data 252 and/or EP characterization data 254 to determine default equipment parameter values and/or ranges, in addition to the data used and/or generated as described herein above.

Detection component 216 can be configured to detect whether an equipment parameter value has drifted and/or is to be updated. In some embodiments, the detection component 216 may use EP threshold data 258, EP setpoint data 260, EP value data 256, and/or corrective action data 262 during operations. In some embodiments, the detection component 216 can detect that the value of an equipment parameter has drifted outside an expected range. In some examples, the detection component 216 monitors current EP value data 256 that indicates a value of an equipment parameter is outside a threshold (e.g., indicated by EP threshold data 258) and/or has changed from a setpoint (e.g., indicated by EP setpoint data 260). The detection component 216 may compare the equipment parameter value with the default value and/or the default range (e.g., determined by machine learning as described herein). The detection component 216 may use machine learning techniques to make such detections. For example, the detection component 216 may utilize one or more trained machine learning models (e.g., model 190 of FIG. 1) in detecting anomalies in equipment parameter data. In some examples, the detection component 216 may utilize historical EP value data 256 to determine that an equipment parameter value is outside an expected range and/or is different from an expected value. In some embodiments, the detection component 216 may determine a corrective action (e.g., indicated by corrective action data 262). In some examples, the detection component 216 may determine that an equipment setting associated with an equipment parameter is to be updated based on output of a machine learning model. In some embodiments, the detection component 216 may determine the corrective action based on comparing a predicted value of a metric corresponding to the equipment parameter (e.g., a predicted value of the equipment parameter) with current EP value data 256. In some embodiments, a notification of the corrective action is provided for display on a graphical user interface (GUI). The notification may indicate a mismatch of the current EP value data and the predicted value of the metric.

Figure 3:
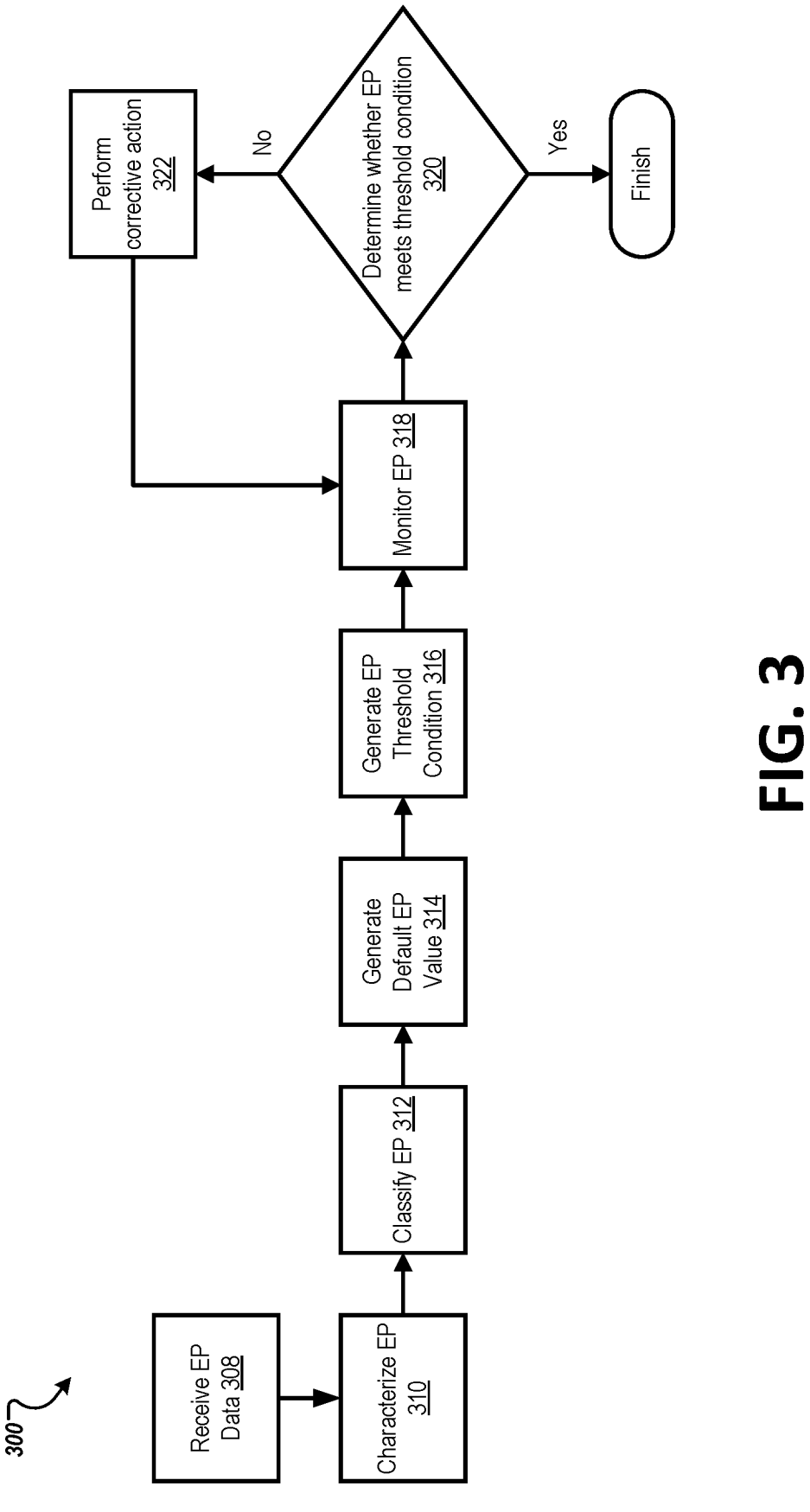
FIG. 3 is a flow chart of a method for equipment parameter management at a manufacturing system, according to aspects of the present disclosure.

FIG. 3 is a flow chart of a method 300 for equipment parameter management at a manufacturing system, according to aspects of the present disclosure. Method 300 is performed by processing logic that can include hardware (circuitry, dedicated logic, etc.), software (such as is run on a general purpose computer system or a dedicated machine), firmware, or some combination thereof. In one implementation, method 300 can be performed by one or more components of a system architecture, such as system architecture 100 of FIG. 1. In other or similar implementations, one or more operations of method 300 can be performed by one or more other machines not depicted in the figures. In some aspects, one or more operations of method 300 can be performed by EP management engine 152. In yet other or similar aspects, one or more operations of method 300 can be performed by predictive component 114.

For simplicity of explanation, the methods are depicted and described as a series of acts. However, acts in accordance with this disclosure can occur in various orders and/or concurrently, and with other acts not presented and described herein. Furthermore, not all illustrated acts can be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 308, processing logic receives data associated with an equipment parameter. For example, processing logic (e.g., of EP management engine 152) receives data indicative of the equipment parameter (e.g., historical and/or current EP value data 256). In some embodiments, processing logic receives data pertaining to equipment parameters of a plurality of process tools at a manufacturing system. For example, processing logic may receive current and/or historical values, metrics, and/or other characteristics associated with one or more equipment parameters of one or more process tools at the manufacturing system. The data received may be data that was collected over a set amount of time and/or a set number of cycles of the manufacturing system. In some examples, the data is collected during a set amount of time, such as one day, two days, one week, etc. In some examples, the data is collected during a preventive maintenance cycle. In some embodiments, the data pertains to EP value data 256 of FIG. 2.

At block 310, processing logic (e.g., of EP management engine 152) characterizes the equipment parameter based on the data received at block 308. Characterization of the equipment parameter may be performed by characterization component 210 of FIG. 2. In some embodiments, processing logic (e.g., of characterization component 210) can determine that a given equipment parameter is to have a constant value within a fleet (e.g., a fleet of like process tools), a constant value within a tool, a quasi-constant value (e.g., substantially constant, below only a threshold variability, etc.), a randomly distributed value, an increasing value (e.g., as in a counter), and/or a text value as described herein above. Processing logic may determine one or more characteristics of the equipment parameter based on the data received at block 308. In some embodiments, the characteristic(s) of the equipment parameter is reflected in a metric corresponding to the equipment parameter. For example, a metric may indicate that the equipment parameter has a characteristic as described herein.

At block 312, processing logic (e.g., of EP management engine 152) classifies the equipment parameter based on the characteristics determined at block 310. Classification of the equipment parameter may be performed by classification component 212 of FIG. 2. In some embodiments, processing logic (e.g., of classification component 212) can assign a classification value to the equipment parameter based on the characteristic(s) of the equipment parameter, as described herein above. The classification value may indicate that the equipment parameter belongs to a discrete classification group, as described herein above. In some embodiments, the classification of the equipment parameter is reflected in a metric corresponding to the equipment parameter. For example, a metric may indicate that the equipment parameter belongs to a discrete classification group as described herein. The metric may indicate that the equipment parameter is assigned a certain classification value. Similar equipment parameters may be assigned like classification values.

At block 314, processing logic (e.g., of EP management engine 152) generates a default equipment parameter value. In some embodiments, the default value is determined based on the data received at block 308 (e.g., historical EP value data 256) and/or based on the classification at block 312. In some embodiments, processing logic generates a default range of values corresponding to the equipment parameter. For example, responsive to the equipment parameter having a characteristic indicating that the equipment parameter can have a range of values (e.g., at block 310), the processing logic may determine the upper and/or lower bounds of the range of values. The upper and/or lower bounds may be default bounds determined by the processing logic. In another example, responsive to the equipment parameter having a characteristic indicating that the equipment parameter is to have a discrete value (e.g., at block 310), the processing logic may determine a setpoint corresponding to the equipment parameter. The setpoint may be a default value assigned to the equipment parameter. In some embodiments, the default value and/or the default range of values is reflected in a metric corresponding to the equipment parameter. For example, a metric may indicate the default value and/or the default range of values of the equipment parameter as described herein. In some embodiments, by analyzing each equipment parameter of the multiple process tools at a manufacturing system (e.g., as done for individual equipment parameters at blocks 310, 312, and 314), a list of equipment parameters can be generated. The list may be used as a benchmark for the equipment parameters associated with the manufacturing system. In some embodiments, the list can be output for implementation at another manufacturing system. For example, the benchmark list of equipment parameters (e.g., reflecting predicted equipment parameter characterization values, predicted equipment parameter classification values, predicted equipment parameter numeric values, etc.) determined at a first manufacturing system can be used as a starting point at a second manufacturing system before adjusting the equipment parameters at the second manufacturing system. Further, processing logic may determine the criticality (e.g., a criticality value)

of the equipment parameter based on the characterization, the classification, and/or historical values of the equipment parameter.

At block 316, processing logic (e.g., of EP management engine 152) generates a threshold condition corresponding to the equipment parameter. In some examples, the threshold condition is based on the data received at block 308, the characterization determined at block 310, the classification determined at block 312, and/or the default value or default range of values determined at block 314. The threshold condition may be a trigger condition to trigger a corrective action as described herein. For example, the threshold condition may indicate that a corrective action is to be performed when the value of the equipment parameter drifts and/or changes a threshold amount from the default value and/or the default range determined at block 314. The threshold condition may allow for a tolerance in the value of the equipment parameter before corrective action is taken. As another example, the threshold condition may allow for the value of the equipment parameter to leave the default range (e.g., determined at block 314) a threshold amount (e.g., a certain percentage of the range) before preventive action is to be performed. If the value of the equipment parameter returns to the default range without exceeding the threshold condition, no preventative action may be taken. In some embodiments, the threshold condition may be associated with a time duration. For example, the threshold condition may indicate that the value of the equipment parameter is permitted to be outside the default range or differ from the setpoint (e.g., default value) for a certain amount of time.

At block 318, processing logic (e.g., of EP management engine 152) monitors the equipment parameter value. In some embodiments, processing logic receives data indicative of the value of the equipment parameter as substrates are processed (e.g., by one or more process tools at the manufacturing facility). The processing logic may monitor the equipment parameter for changes in the value of the equipment parameter.

At block 320, processing logic (e.g., of EP management engine 152) determines whether the value of the equipment parameter meets the threshold condition determined at block 316. If the equipment parameter value meets the threshold condition, the method may be finished. However, if the equipment parameter value does not meet the threshold condition, the method may proceed to block 322. In some embodiments, the processing logic compares a predicted value of a metric (e.g., determined at block 310, 312, and/or 314) with data received (e.g., at block 308 and/or during substrate processing). The processing logic may determine a mismatch between the predicted value of the metric and the data. In some embodiments, the operations of block 318 and/or of block 320 are performed by detection component 216 of FIG. 2.

At block 322, processing logic (e.g., of EP management engine 152) may cause a corrective action to be performed. In some embodiments, the corrective action may include updating an equipment setting associated with the equipment parameter. Updating the setting may cause the value of the equipment parameter to return to the default value and/or to the default range of values. In some embodiments, the corrective action includes providing a notification for display on a GUI. The notification may be indicative of a mismatch of data with the predicted value of the metric (e.g., determined at block 310, block 312, and/or block 314). In some embodiments, the notification may indicate (e.g., to a user, etc.) that the value of the equipment parameter is to be updated. In some embodiments, the notification may be indicative of a failure of a process tool component and/or a failure of the process tool. In some embodiments, the user may override the processing logic by providing input (e.g., via a GUI) that the equipment parameter is not to be updated. In some embodiments, the user may provide input that the equipment parameter is to be updated an amount determined by the user. The user input may be included in machine learning training data as discussed below with reference to FIG. 4. Subsequent to the operations of block 322, the method may loop to block 318.

In some embodiments, any of block 310, block 312, block 314, block 316, and/or block 320 may be performed using machine learning techniques as described herein.

FIG. 4 is a flow chart of a method 400 for training a machine learning model (e.g., machine learning model 190, etc.), according to aspects of the present disclosure. Method 400 is performed by processing logic that can include hardware (circuitry, dedicated logic, etc.), software (such as is run on a general purpose computer system or a dedicated machine), firmware, or some combination thereof. In one implementation, method 400 can be performed by one or more components of a system architecture, such as system architecture 100 of FIG. 1. In other or similar implementations, one or more operations of method 400 can be performed by one or more other machines not depicted in the figures. In some aspects, one or more operations of method 400 can be performed by predictive server 112 of predictive system 110. In other or similar aspects, one or more operations of method 400 can be performed by EP management engine 152.

For simplicity of explanation, the methods are depicted and described as a series of acts. However, acts in accordance with this disclosure can occur in various orders and/or concurrently, and with other acts not presented and described herein. Furthermore, not all illustrated acts can be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 410, processing logic initializes a training set T to an empty set (e.g., { }). At block 412, processing logic identifies historical data associated with historical equipment parameters of a plurality of process tools at a manufacturing system. In some embodiments, the historical data reflects historical equipment parameter values. The historical data can include data collected during processing of substrates by the plurality of process tools. The historical data may have been collected during a set amount of time (e.g., a time period such as one day, one week, one preventive maintenance cycle, etc. as described herein). In some embodiments, the historical data can further include contextual data associated with the historical equipment parameters. For example, the historical data can include an indication of known bad process tools and/or known bad data and so forth. In some embodiments, processing logic can identify the historical data from data store 140 and/or memory 250, as described above.

At block 414, processing logic identifies a set of historical metrics corresponding to the historical equipment parameters of the plurality of process tools at the manufacturing system. In some embodiments, the historical metrics may correspond to historical equipment parameter characterizations, classifications, and/or default values or default value ranges. The historical metrics may be generated following the collection of the historical data during substrate processing (e.g., by one or more process tools) and stored at data store 140 and/or memory 250. Processing logic can identify the set of historical metrics from data store 140 and/or memory 250, in accordance with previously described embodiments.

At block 416, processing logic generates training input data based on the identified historical data associated with the historical equipment parameters. In some embodiments, the training input can include a normalized set of equipment parameter data (e.g., including equipment parameter values as described herein).

At block 418, processing logic can generate target output data based on the identified set of historical metrics. The generated target output data can correspond to equipment parameter metrics (e.g., classification metrics, characterization metrics, value metrics, etc.), in some embodiments.

At block 420, processing logic generates a mapping between the training input data and the target output data. At block 422, processing logic adds the mapping to training set T.

At block 424, processing logic determines whether the training set T includes a sufficient amount of training data to train a machine learning model. It should be noted that in some implementations, the sufficiency of training set T can be determined based simply on the number of mappings in the training set, while in some other implementations, the sufficiency of training set T can be determined based on one or more other criteria (e.g., a measure of diversity of the training examples, etc.) in addition to, or instead of, the number of input/output mappings. Responsive to determining the training set does not include a sufficient amount of training data to train the machine learning model, method 400 returns to block 412. Responsive to determining the training set, T, includes a sufficient amount of training data to train the machine learning model, method 500 continues to block 426.

At block 426, processing logic provides training set T to train the machine learning model. In one implementation, the training set T is provided to training engine 182 of server machine 180 to perform the training. In the case of a neural network, for example, input values of a given input/output mapping are input to the neural network, and output values of the input/output mapping are stored in the output nodes of the neural network. The connection weights in the neural network are then adjusted in accordance with a learning algorithm (e.g., backpropagation, etc.), and the procedure is repeated for the other input/output mappings in the training set T. After block 426, machine learning model 190 can be used to predict, given process data and/or sensor data, metrology measurement values associated with a substrate and an amount of drift of the metrology measurement values from target metrology measurement values, in accordance with embodiments described above.

Figure 5:
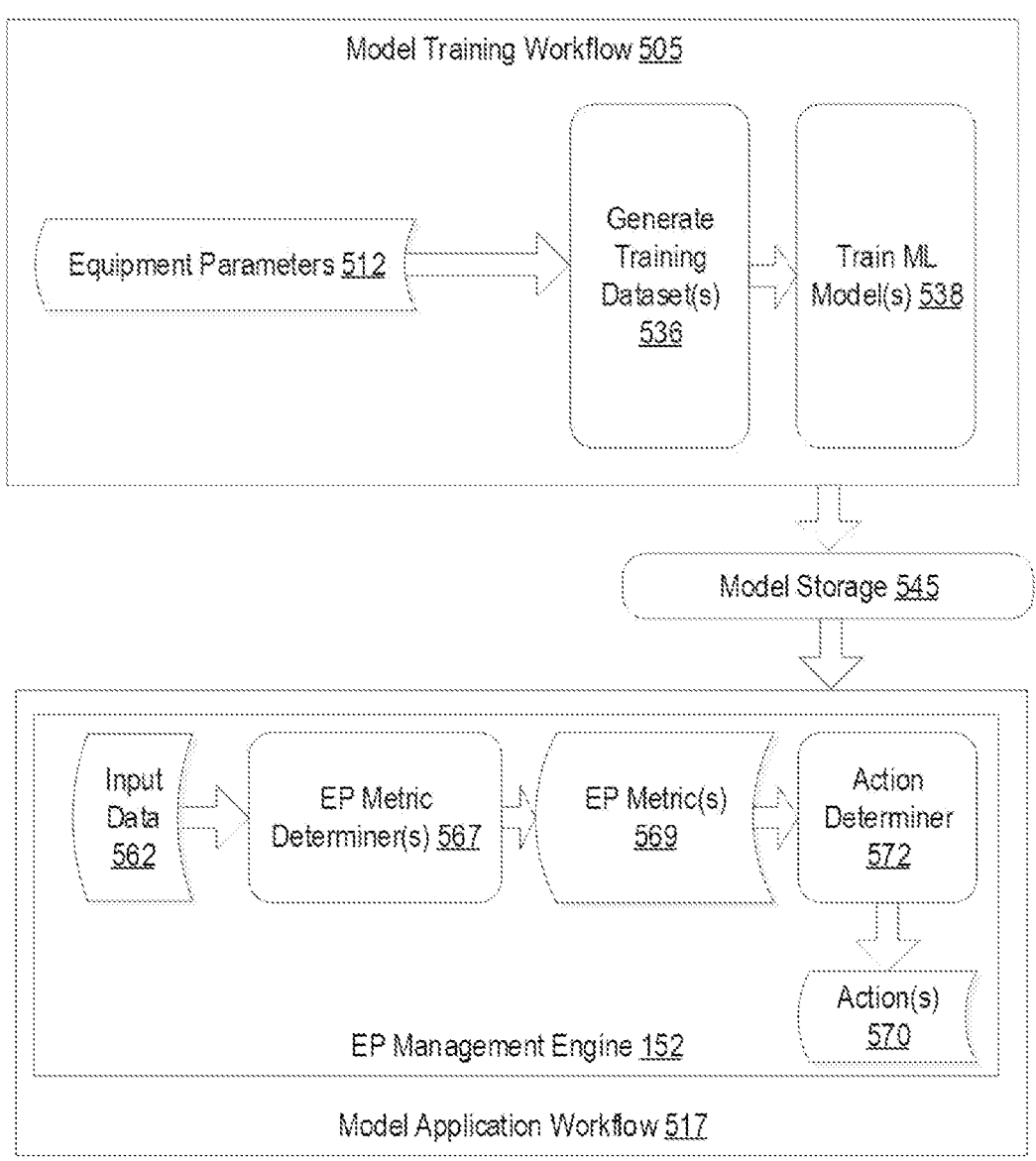
FIG. 5 illustrates a model training workflow and a model application workflow for equipment parameter management, according to one embodiment.

FIG. 5 illustrates a model training workflow 505 and a model application workflow 517 for equipment parameter management according to one embodiment. Model training workflow 505 and model application workflow 517 may be performed by processing logic executed by a processor of a computing device. One or more of these workflows 505, 517 may be implemented, for example, by one or more machine learning models implemented on a processing device and/or other software and/or firmware executing on a processing device.

The model training workflow 505 is to train one or more machine learning models (e.g., deep learning models) to determine predicted metrics associated with equipment parameters of process tools at a manufacturing system. Model application workflow 517 is to apply the one or more trained machine learning models to perform equipment parameter management. Each of the equipment parameters 512 may be indicative of an equipment setting of a process tool.

Various machine learning outputs are described herein. Particular numbers and arrangements of machine learning models are described and shown. However, it should be understood that the number and type of machine learning models that are used and the arrangement of such machine learning models can be modified to achieve the same or similar end results. Accordingly, the arrangements of machine learning models that are described and shown are merely examples and should not be construed as limiting.

In some embodiments, one or more machine learning models are trained to perform one or more metric prediction tasks. Each task may be performed by a separate machine learning model. Alternatively, a single machine learning model may perform each of the tasks or a subset of the tasks. For example, a first machine learning model may be trained to determine a predicted first metric such as a characterization value or a classification value, and a second machine learning model may be trained to determine a second predicted metric, such as a predicted equipment parameter value or a predicted equipment parameter value range. Additionally, or alternatively, different machine learning models may be trained to perform different combinations of the tasks. In an example, one or a few machine learning models may be trained, where the trained machine learning (ML) model is a single shared neural network that has multiple shared layers and multiple higher level distinct output layers, where each of the output layers outputs a different prediction, classification, identification, etc. For example, a first higher level output layer may determine a characterization value or a classification value, and a second higher level output layer may determine a predicted value of the equipment parameter.

One type of machine learning model that may be used to perform some or all of the above tasks is an artificial neural network, such as a deep neural network. Artificial neural networks generally include a feature representation component with a classifier or regression layers that map features to a target output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset.

For model training workflow 505, a training dataset containing hundreds, thousands, tens of thousands, hundreds of thousands or more equipment parameters 512 should be used to form a training dataset. Data may include, for example, historic equipment parameter values, characterizations, and/or classifications. This data may be processed to generate one or more training datasets 536 for the training of one or more machine learning models. Training data items in training datasets 536 may include equipment parameters 512, equipment parameter classifications, equipment parameter characterizations, and/or equipment parameter values.

To effectuate training, processing logic inputs the training dataset(s) 536 into one or more untrained machine learning models. Prior to inputting a first input into a machine learning model, the machine learning model may be initialized. Processing logic trains the untrained machine learning model(s) based on the training dataset(s) to generate one or more trained machine learning models that perform various operations as set forth above. Training may be performed by inputting input data such as one or more equipment parameters 512 (e.g., equipment parameter characterizations, equipment parameter classifications, equipment parameter values, etc.), and/or age information of process tools (e.g., process tool components) into the machine learning one at a time.

The machine learning model processes the input to generate an output. An artificial neural network includes an input layer that consists of values in a data point. The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class, prediction and/or output that the machine learning model can produce.

Accordingly, the output may include one or more predictions or inferences (e.g., predicted values of a metric corresponding to the equipment parameters). Processing logic may compare the output estimated metric(s) against historical metric(s). Processing logic determines an error (i.e., a classification error) based on the differences between the estimated metric(s) and the target metric(s). Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed to determine whether the model has improved and to determine a current accuracy of the deep learning model. After one or more rounds of training, processing logic may determine whether a stopping criterion has been met. A stopping criterion may be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 40% or 90% accuracy. In one embodiment, the stopping criterion is met if accuracy of the machine learning model has stopped improving. If the stopping criterion has not been met, further training is performed. If the stopping criterion has been met, training may be complete. Once the machine learning model is trained, a reserved portion of the training dataset may be used to test the model. Once one or more trained machine learning models 538 are generated, they may be stored in model storage 545, and may be added to EP management engine 152.

For model application workflow 517, according to one embodiment, input data 562 may be input into one or more EP metric determiners 567, each of which may include a trained neural network or other model. Additionally, or alternatively, one or more EP metric determiner 567 may apply image processing algorithms to determine chamber component conditions. The input data may include a value of an equipment parameter (e.g., a characterization value, a classification value, a numeric value, etc.). Based on input data 562, EP metric determiner(s) 567 may output one or more predicted EP metric(s) 569. The predicted EP metric(s) 569 may include a metric corresponding to the equipment parameters (e.g., a metric reflecting one or more of a characterization, a classification, or a value, etc.).

An action determiner 572 may determine, based on the predicted EP metric(s) 569, one or more actions 570 to perform. In one embodiment, action determiner 572 compares the predicted EP metrics to data indicative of an equipment setting. If one or more of the predicted EP metrics differs from the data more than a threshold amount, then action determiner 572 may determine that updating the equipment parameter and/or the equipment setting for future substrate processing is recommended, and may output a recommendation or notification to update the equipment parameter and/or the equipment setting. In some embodiments, action determiner 572 automatically updates equipment parameter metric(s) based on predicted EP metric(s) 569 meeting one or more criteria. However, in some embodiments, a user may provide input (e.g., via a GUI) to update the equipment parameter (e.g., based on the output recommendation or notification). The user may provide input for processing logic not to update the equipment parameter, or to update the equipment parameter a specified amount (e.g., specified by the user). In some examples, the user may provide input to update the equipment parameter an amount different from an amount recommended by the action determiner 572.

FIG. 6 is a flow chart of a method 600 for estimating an equipment parameter using machine learning, according to aspects of the present disclosure. Method 600 is performed by processing logic that can include hardware (circuitry, dedicated logic, etc.), software (such as is run on a general purpose computer system or a dedicated machine), firmware, or some combination thereof. In one implementation, method 600 can be performed by one or more components of a system architecture, such as system architecture 100 of FIG. 1. In other or similar implementations, one or more operations of method 600 can be performed by one or more other machines not depicted in the figures. In some aspects, one or more operations of method 600 can be performed by predictive server 112 of predictive system 110. In other or similar aspects, one or more operations of method 600 can be performed by EP management engine 152.

For simplicity of explanation, the methods are depicted and described as a series of acts. However, acts in accordance with this disclosure can occur in various orders and/or concurrently, and with other acts not presented and described herein. Furthermore, not all illustrated acts can be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 610, processing logic (e.g., of a processing device, of EP management engine 152, etc.) receives first data associated with an equipment parameter. In some embodiments, the equipment parameter includes one or more of a calibration value, an offset value, and/or a scaling factor value associated with a process tool (e.g., a component of a process tool, etc.). The first data may be indicative of an equipment setting of a process tool of a plurality of process tools at a first manufacturing system. In some examples, the first data reflects one or more values and/or characteristics of the equipment parameter. Each of the values may correspond to a setting of a process tool.

At block 612, processing logic provides the first data as input to a trained machine learning model (e.g., model 190 of FIG. 1). In some embodiments, the trained machine learning model is trained using historical data pertaining to equipment parameters of the plurality of process tools. For example, the trained machine learning model may be trained with input data identifying each equipment parameter of each process tool at the manufacturing system. The trained machine learning model may be trained with target output data identifying values of a metric corresponding to each equipment parameter. In some embodiments, the processing logic receives second data associated with the equipment parameter and provides the second data as further training input data to the trained machine learning model to further train the trained machine learning model. In some embodiments, the second data is data collected subsequent to an update to one or more equipment parameters (e.g., one or more updates to one or more equipment parameter values, etc.).

At block 614, processing logic obtains, as output of the trained machine learning model, a predicted value of a metric corresponding to the equipment parameter. In some embodiments, the predicted value of the metric may include a predicted characterization value indicative of a characteristic of the equipment parameter. In some embodiments, the predicted value of the metric includes a predicted default value associated with a set point of the equipment parameter. In some embodiments, the predicted value of the metric includes a predicted range of default values associated with the equipment parameter.

At block 616, the processing logic compares the predicted value of the metric with the first data. For example, the processing logic may compare the predicted value of the metric reflecting a predicted equipment parameter value with equipment parameter values reflected in the first data. In another example, the processing logic may compare the predicted value of the metric reflecting a predicted characterization value with equipment parameter characterization values reflected in the first data.

At block 618, the processing logic performs a corrective action (e.g., causes a corrective action to be performed) based on the comparing at block 616. In some embodiments, the corrective action may be performed responsive to determining that a mismatch exists with respect to the predicted value of the metric and the first data. For example, the corrective action may be performed responsive to determining that a predicted characterization value (e.g., reflected by the predicted metric) does not match a characterization value reflected in the first data. In another example, the corrective action may be performed responsive to determining that a predicted equipment parameter value (e.g., reflected by the predicted metric) does not match an equipment parameter value reflected in the first data. In some embodiments, the corrective action includes updating the equipment setting associated with the equipment parameter. For example, the equipment setting may be updated so that the value and/or characterization of the equipment parameter is updated to match (e.g., more closely match) the predicted value/characterization, etc. reflected in the predicted metric. A notification of the corrective action may be provided to a GUI in some embodiments.

Figure 7:
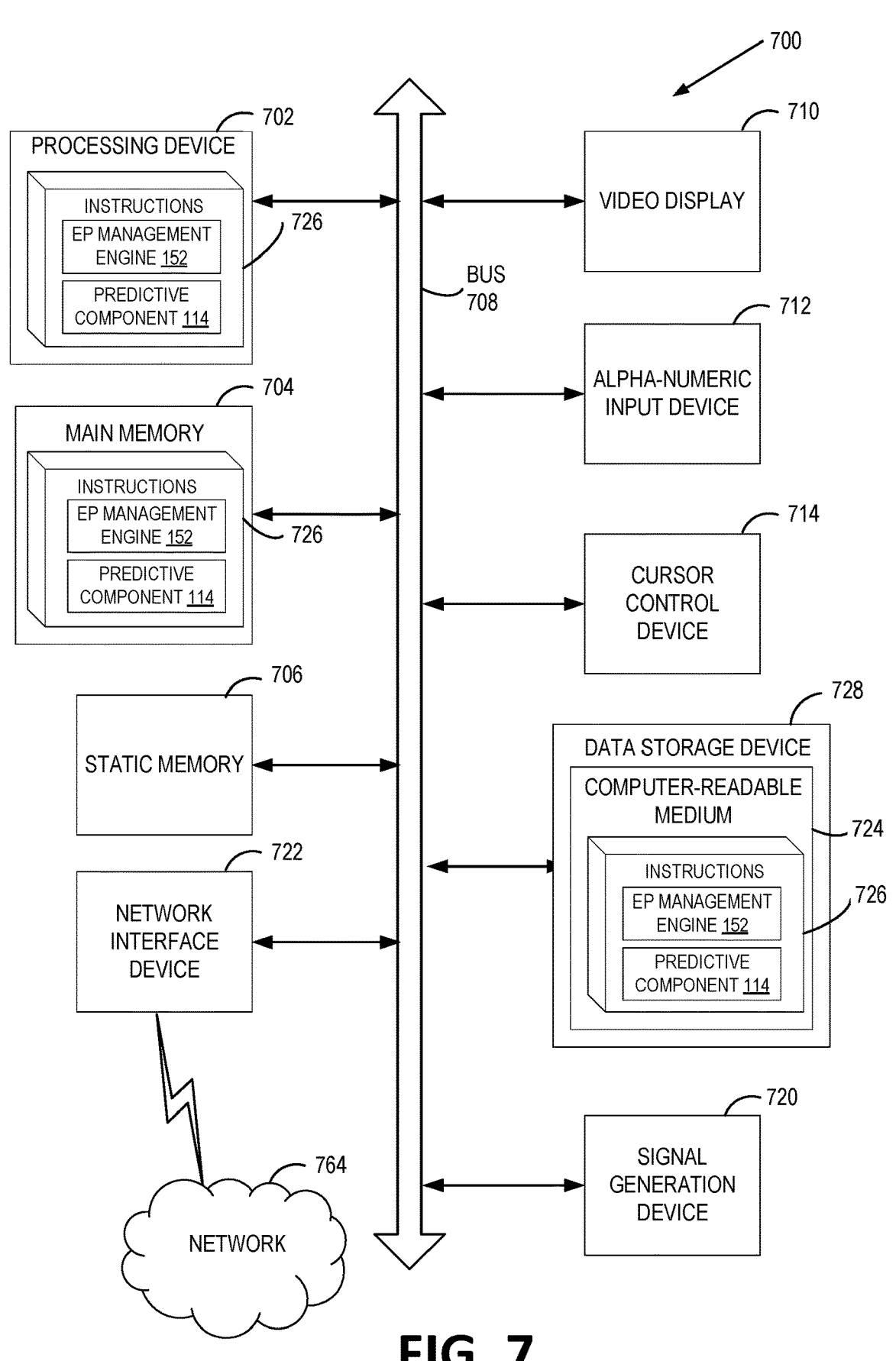
FIG. 7 depicts a block diagram of an illustrative computer system operating in accordance with one or more aspects of the present disclosure.

FIG. 7 depicts a block diagram of an illustrative computer system 700 operating in accordance with one or more aspects of the present disclosure. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In embodiments, computing device 700 may correspond to predictive server 112 of FIG. 1, and/or another processing device of manufacturing system 100.

The example computing device 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 728), which communicate with each other via a bus 708.

Processing device 702 may represent one or more general-purpose processors such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 may also be or include a system on a chip (SoC), programmable logic controller (PLC), or other type of processing device. Processing device 702 is configured to execute the processing logic for performing operations discussed herein.

The computing device 700 may further include a network interface device 722 for communicating with a network 764. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 728 may include a machine-readable storage medium (or more specifically a non-transitory computer-readable storage medium) 724 on which is stored one or more sets of instructions 726 embodying any one or more of the methodologies or functions described herein. Wherein a non-transitory storage medium refers to a storage medium other than a carrier wave. The instructions 726 may also reside, completely or at least partially, within the main memory 704 and/or within the processing device 702 during execution thereof by the computer device 700, the main memory 704 and the processing device 702 also constituting computer-readable storage media.

The computer-readable storage medium 724 may also be used to store model 190 and data used to train model 190. The computer readable storage medium 724 may also store a software library containing methods that call model 190. While the computer-readable storage medium 724 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of operations of each method may be altered so that certain operations may be performed in an inverse order so that certain operations may be performed, at least in part, concurrently with other operations. In another embodiment, instructions or sub-operations of distinct operations may be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving first data indicative of an input value of a setting for calibration of an equipment parameter of a process tool of a plurality of process tools of a first manufacturing system;
   providing at least the first data as input to a trained machine learning model, wherein the trained machine learning model is trained using historical data pertaining to equipment parameters of the plurality of process tools of the first manufacturing system;
   obtaining, as output of the trained machine learning model, a predicted value of a metric corresponding to the equipment parameter;
   comparing the predicted value of the metric with the first data; and
   updating the setting for calibration of the equipment parameter based on the comparing.

2. The method of claim 1, wherein
   the setting for calibration of the equipment parameter is updated to match the predicted value of the metric.

3. The method of claim 1, further comprising:

providing a notification for display on a graphical user interface (GUI) indicative of a mismatch of the first data with the predicted value of the metric.

4. The method of claim 1, wherein the historical data pertaining to the equipment parameters of the plurality of process tools comprises training input data identifying each equipment parameter and target output data identifying values of a metric corresponding to each equipment parameter.

5. The method of claim 4, further comprising:

receiving second data associated with the equipment parameter; and providing the second data as training input data to the trained machine learning model to further train the trained machine learning model.

6. The method of claim 1, wherein the predicted value of the metric comprise one or more of:

a predicted characterization value indicative of a characteristic of the equipment parameter; or a predicted default value associated with a set point of the equipment parameter.

7. The method of claim 6, further comprising:

outputting at least one of the predicted characterization value or the predicted default value for implementation at a second manufacturing system.

8. The method of claim 1, wherein the equipment parameter comprises one or more of a calibration value, an offset value, or a scaling factor value associated with the process tool.

9. A system comprising:

a memory; and a processing device coupled to the memory, the processing device to:

receive first data indicative of an input value of a setting for calibration of an equipment parameter of a process tool of a plurality of process tools of a first manufacturing system;

provide at least the first data as input to a trained machine learning model, wherein the trained machine learning model is trained using historical data pertaining to equipment parameters of the plurality of process tools of the first manufacturing system;

obtain, as output of the trained machine learning model, a predicted value of a metric corresponding to the equipment parameter;

compare the predicted value of the metric with the first data; and update the setting for calibration of the equipment parameter based on the comparing.

10. The system of claim 9, wherein the setting for calibration of the equipment parameter is updated to match the predicted value of the metric.

11. The system of claim 9, wherein the processing device is further to:

provide a notification for display on a graphical user interface (GUI) indicative of a mismatch of the first data with the predicted value of the metric.

12. The system of claim 9, wherein the historical data pertaining to the equipment parameters of the plurality of process tools comprises training input data identifying each equipment parameter and target output data identifying values of a metric corresponding to each equipment parameter.

13. The system of claim 9, wherein the predicted value of the metric comprises one or more of:

a predicted characterization value indicative of a characteristic of the equipment parameter; or a predicted default value associated with a set point of the equipment parameter.

14. The system of claim 9, wherein the equipment parameter comprises one or more of a calibration value, an offset value, or a scaling factor value associated with the process tool.

15. A non-transitory computer readable medium comprising instructions that, when executed by a processing device, cause the processing device to:

receive first data indicative of an input value of a setting for calibration of an equipment parameter of a process tool of a plurality of process tools of a first manufacturing system;

provide at least the first data as input to a trained machine learning model, wherein the trained machine learning model is trained using historical data pertaining to equipment parameters of the plurality of process tools of the first manufacturing system;

obtain, as output of the trained machine learning model, a predicted value of a metric corresponding to the equipment parameter;

compare the predicted value of the metric with the first data; and update the setting for calibration of the equipment parameter based on the comparing.

16. The non-transitory computer readable medium of claim 15, wherein the setting for calibration of the equipment parameter is updated to match the predicted value of the metric.

17. The non-transitory computer readable medium of claim 15, wherein the historical data pertaining to the equipment parameters of the plurality of process tools comprises training input data identifying each equipment parameter and target output data identifying values of a metric corresponding to each equipment parameter.

18. The non-transitory computer readable medium of claim 17, wherein the processing device is further to:

receive second data associated with the equipment parameter; and provide the second data as training input data to the trained machine learning model to further train the trained machine learning model.

19. The non-transitory computer readable medium of claim 15, wherein the predicted value of the metric comprises one or more of:

a predicted characterization value indicative of a characteristic of the equipment parameter; or a predicted default value associated with a set point of the equipment parameter.

20. The non-transitory computer readable medium of claim 15, wherein the equipment parameter comprises one or more of a calibration value, an offset value, or a scaling factor value associated with the process tool.

* * * * *